Feb. 3, 1959 K. J. HARRIS ET AL 2,871,963
MULTIPLE-FUNCTION IMPLEMENT CONTROL SYSTEM
FOR AGRICULTURAL TRACTOR
Filed Nov. 3, 1954 4 Sheets-Sheet 1

INVENTORS
K.J.Harris &
C.H.Hess

INVENTORS
K. J. Harris &
C. H. Hess

United States Patent Office 2,871,963
Patented Feb. 3, 1959

2,871,963

MULTIPLE-FUNCTION IMPLEMENT CONTROL SYSTEM FOR AGRICULTURAL TRACTOR

Kenneth J. Harris and Christian H. Hess, Waterloo, Iowa, assignors, by mesne assignments, to Deere & Company, a corporation of Delaware Application November 3, 1954, Serial No. 466,623

11 Claims. (Cl. 172—465)

This invention relates to an agricultural tractor and more particularly to improvements in power means for controlling the operational relationships of implements used with the tractor.

A tractor-plow outfit will be selected as a specific example of an agricultural organization in which the invention finds particular utility; although, it will be appreciated that the invention has wider application. As in conventional practice, the plow is draft-connected to the tractor for travel with the tractor over a field and is controlled by power means combining the important advantages of a load-responsive system, such as in the U. S. Patent to Ferguson 2,118,180, with those of what is known as a position-responsive system, wherein the position of the plow is determined solely by setting of the hand lever, a good example of which is disclosed in the U. S. Patent to Worstell 2,477,710. When the two systems are combined, as in assignee's copending application Serial No. 258,231, filed November 26, 1951, now U. S. Patent No. 2,721,508, the position of the valve changes in response to any one of the following: First, manual adjustment of the hand lever; second, attainment by the implement or draft linkage of the positions selected by the hand lever; and, third, deflection of the spring incident to movement of the control member (here the top link) in accordance with changes in draft load. Although, as already evidenced here by reference to assignee's copending patent, the advantages of coordinating the foregoing factors have already been appreciated and are therefore not broadly claimed here as being novel, it is nevertheless a feature of the present invention to improve the combined position-and-load-responsive system by utilizing specifically novel followup linkage in the environment noted.

The present day tractor when conventionally equipped with a power lift or power control system utilizes a housing arrangement in association with the main tractor body housing and many of the tractors feature either built-in or conversion systems but few are readily adapted to the installation of the system as either original equipment or optional installation. According to the present invention, the advantages of both characteristics are achieved by the provision of a novel casing and housing arrangement, more specifically involving the superimposition on a built-in cylinder system of a remote cylinder system, and preferably one including multiple functions for controlling a plurality of remote cylinders. The plural cylinder system is preferably arranged so that fluid flow is in series through one valve, the motor controlled by that valve, then through another valve and then through the motor controlled by that other valve, or selectively for diversion to the reservoir upon operation of either of the valves and motors independently of the other. The power lift system incorporates a safety valve for relieving high presures in the system due to external forces applied to the implement or draft linkage in a direction opposed to the direction of movement incurred by the supply of fluid pressure to the motor. One example of such a situation occurs during transport of the plow while it is in raised position. In the event that the tractor encounters an abrupt departure downwardly from the normal terrain, the shock loads on the power lift system are quite extensive. According to the present invention, the safety valve is operative to relieve the fluid lock in the motor and thereby to provide a cushion eliminating all if not the major effects of the shock loading. Because of the incorporation of the follow-up means, lowering of the plow because of opening of the safety valve is immediately followed by return of the plow to its original position because the hydraulic valve is actuated in response to the change in position.

Another object is to provide improved housing structure for the power control means.

The foregoing and other desirable objects inherent in and encompassed by the invention will become apparent as a preferred embodiment of the invention is disclosed in detail in the following specification and accompanying sheets of drawings, the several figures of which will be described below.

Figure 1:
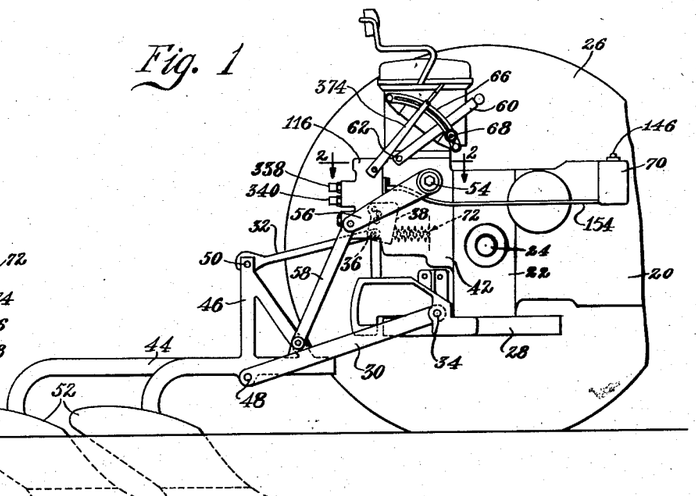
Fig. 1 is a representative side elevational view of the rear portion of a tractor and draft-connected plow, the near wheel of the tractor having been omitted in the interests of clarity.

The rear end portion of a well known type of agricultural tractor will be recognized in Fig. 1 as having a rear relatively narrow body part 20, conventionally supported on transverse rear axle structure 22 from which transverse axles extend in opposite directions to mount traction wheels. In the present disclosure, only one such axle is shown at 24 and only one traction wheel appears at 26, the near or right-hand traction wheel, as already explained above, having been removed to clarify the illustration.

The under portion of the axle housing 22 carries drawbar structure 28 and, in addition, the tractor is equipped with hitch or draft linkage comprising a pair of lower links 30 (only one of which is shown) and an upper or top link 32. The lower links are pivoted at their forward ends to the tractor at 34 and the top link 32 is pivotally connected at its forward end at 36 to a load- or draft-responsive yoke or control member 38, which is itself rockably mounted on the tractor by means of a short transverse rockshaft 40 journaled in a main power lift or power control casing 42 that is secured to the rear end of the tractor in a manner to be brought out in detail below.

The draft linkage 30—32 is utilized for the purpose of connecting various implements to the tractor. For the purposes of present illustration, the draft linkage serves to draft-connect to the tractor a trailing ground-working implement, here in the form of a two-bottom plow having longitudinal beam structure 44 and an upright forwardly located mast 46. The draft and top links are connected at their rear ends respectively to the beam structure 44 and to the mast 46 by pivot pins 48 and 50. The two plow bottoms, designated by the numeral 52, are shown as plowing at a substantially maximum depth, the long horizontal line in Fig. 1 representing the ground line.

Vertical adjustment of the draft linkage 30—32 for the purpose of varying the plowing depth is accomplished by means of a power lift or power control system contained in part in the casing 42. The details of this structure will be described later. For present purposes, it is deemed sufficient to explain that the power lift mechanism includes a transverse load-moving or lifting member in the form of a rock-shaft 54 to each end of which is keyed a rearwardly extending lifting arm 56, only one of which is shown. Each lift arm 56 is connected to its corresponding draft link 30 by means of a lift link 58. Regulation of the power control system is effected by means of a manual control or hand lever 60, keyed at its lower end to a transverse control shaft 62 mounted in an upper portion of the main casing 42. The shaft 62 is equipped with friction means of any suitable type such as is designated generally by the numeral 64 in Fig. 2, which is utilized to create resistance to free rocking of the shaft 62 so as to afford settable positioning of the hand lever relative to an arcuately slotted control sector 66. Thus, any selected position of the lever 60 may be considered fixed; although, the condition may be forcibly changed. A selectively settable stop 68 is positionable in the sector 66 to establish an adjustable limit for forward positioning of the lever 60, all of which is generally conventional and requires no detailed explanation. The lever 60 controls the position of a valve, to be described below, which in turn controls the fluid-pressure-operated system or circuit including a pump 70 that is driven from any suitable source on the tractor.

In a straight or pure load-responsive system, the position of the lever 60 will initially determine the amount of valve opening which in turn will cause the rockshaft 54 to rock in a counterclockwise direction for lowering the draft linkage 30—32 until the plow bottoms 52 contact the ground. As the tractor moves forwardly, the plow bottoms will enter the ground and the ultimate depth thereof will be determined by the balance of draft forces against yielding means, designated generally by the numeral 72, acting on the yoke 38. That is to say, soil resistance to the plow bottoms 52 will vary the extent to which fore-and-aft forces are applied to the top link 32 and these forces result in the transmission of fore-and-aft movement to the control yoke 38 which is in turn opposed by the yielding means 72. The yielding means illustrated here comprises a first or outer coil spring 74 and a second or inner coil spring 76. The outer spring, although of larger diameter than that of the inner spring, is a relatively low-rate or "soft" spring. The inner spring is relatively stiffer and has a higher rate. However, the position of the springs could be reversed or otherwise modified. It will also be observed that although the inner or right-hand ends of both springs seat against an anchor portion 78 of the main casing 42, the outer or left-hand ends are arranged differently as respects each other and a pocket 80 in the yoke 38. The difference resides in the lost-motion arrangement as respects the inner spring 76. That is to say, whereas the left-hand end of the outer spring 74 is in direct contact with the pocket 80, there is initially a space between the pocket and the left-hand end of the inner spring 76. Because of the direct contact of both ends of the soft outer spring with the anchor 78 and pocket 80, the soft spring is immediately effective and movement of the draft-actuated member or yoke 38 in an initial range is opposed exclusively by the soft spring, and after the lost motion is taken up between the pocket 80 and the left-hand end of the inner and stiffer spring 76, movement of the member or yoke 38 in a range beyond the initial range is opposed by both springs. The arrangement thus provides for what may be termed "soft" operation with small loads and consequently small deflections of the yoke 38 in a forward direction. Therefore, the sensitivity of the system for small loads is many times greater than would be the case if a single spring were used, because such single spring would have to be made stiff enough to accommodate heavier loads. In the present instance, the accommodation of heavier loads is afforded by the stiffer inner spring 76, which leaves the initial deflection of the soft outer spring 74 available for handling lighter loads. This is particularly important in view of the wide range of loads accommodated by the ordinary tractor. An example of this situation is afforded by recognizing the differences in loads imposed on the tractor by a cultivator and a sub-soiler, assuming that the same tractor would be used at different times with these two implements. Consequently, the limitations on the range of performance obtainable with a single load-control spring are substantially reduced by use of the compound or double spring.

As a further refinement in the sensitivity pattern as respects adjustment of the hydraulic valve in response to variations in draft forces or load, the yoke 38, in addition to the pivot point 36, has a number—preferably three—of additional connecting points, represented here by additional openings 82, 84 and 86. The moment arm about the rock-shaft pivot 40 may therefore be varied by connecting the top link 32 to any one of the other openings 82, 84 or 86, thus varying the ratio at which the thrust forces in the top link will be transferred to the biasing means 72.

Figures 7, 8:
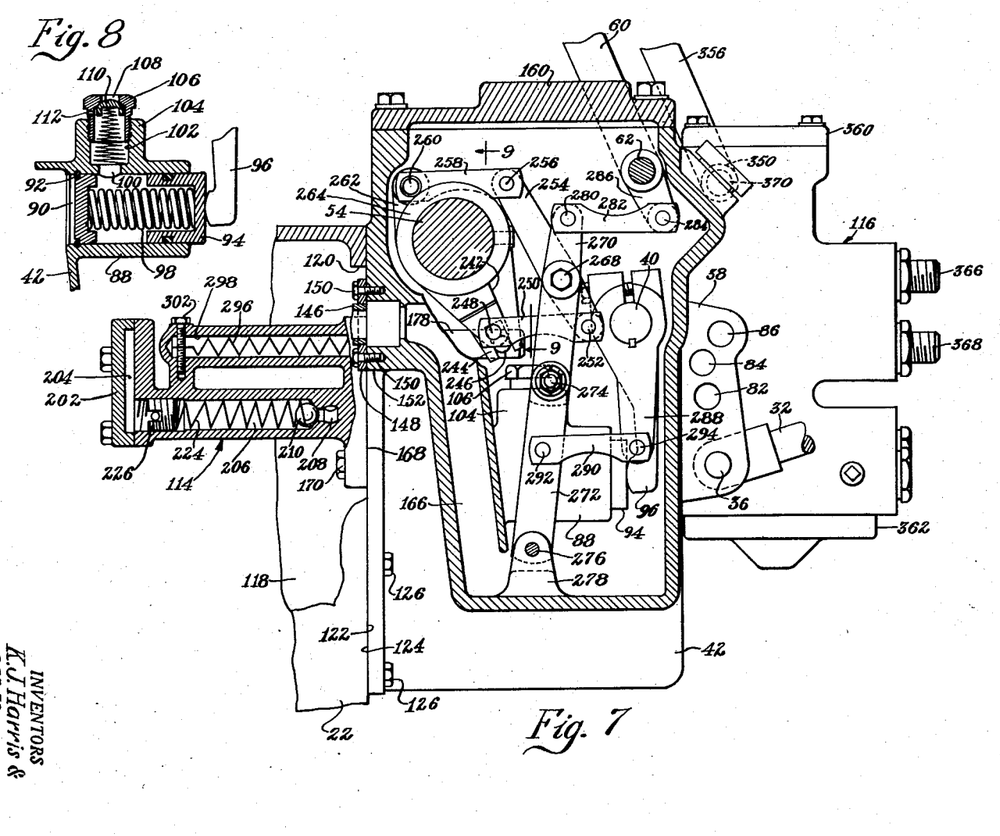
Fig. 7 is a view from the opposite side of Fig. 6, being partly in section along the irregular line 7—7—7—7—7—7 of Fig. 2.
Fig. 8 is a sectional view of the shock-absorbing means or dash-pot.
Figure 9:
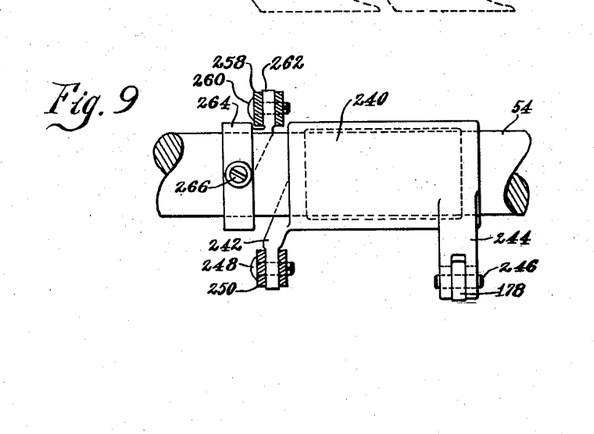
Fig. 9 is a fragmentary elevational view, partly in section, as seen along the line 9—9 of Fig. 7.

The present case discloses shock-absorbing means for damping oscillations and vibrations in the draft control linkage, the details of which, along with the dual-spring arrangement described above, are covered in assignee's copending application Ser. No. 466,649 filed Nov. 3, 1954. This means also serves to eliminate sporadic response of the valve to temporary thrust loads in the top link 32. A preferred embodiment of the shock-absorbing means is illustrated in Fig. 8 and the general location thereof in the main casing 42 appears in Fig. 7. Fig. 8 illustrates that the shock absorbing means is in the form of a dash-pot comprising a cylinder 88 preferably formed integrally with the casting structure of the main casing 42. One end of the cylinder is closed by a cast disk 90 held in place by a snap ring 92. A piston 94 is carried in the cylinder 88 and projects at the rear of the cylinder for engagement with an arm 96 keyed to the rockshaft 40 on which the load-control yoke 38 is mounted, it being noted in this respect that the rear portion of the main casing 42 is recessed to accommodate the yoke 38, thus disposing the yoke externally of the casing whereas the rockshaft 40 and the dash-pot-engaging arm 96 is within or enclosed by the casing. The dash-pot piston 94 is biased or loaded in one direction by a coil spring 98 and the piston is movable in the opposite direction and against the bias of the spring 98 by forward swinging of the arm 96 when increased load is applied to the load-control yoke 38. The interior of the main casing 42 serves as a reservoir for the oil or equivalent fluid used in the hydraulic circuit. The dash-pot draws on this fluid for functioning and for this purpose the cylinder 88 includes a fluid port 100 in communication with a bore 102 in an integral annulus 104. A cap 106 threaded into the bore 102 has an intake port 108 that is normally closed by a spring-loaded valve 110. The cap additionally has a restricted outlet orifice 112. In operation, the dash-pot spring 98 constantly urges the dash-pot piston 94 rearwardly or in a direction in opposition to the draft forces imposed on the load-control yoke 38. During movement of the piston in this direction, oil is taken in through the intake port 108, the valve 110 opening to admit the oil. In the event that sudden shock loads are imposed on the top link 32, which loads are transmitted to the yoke 38, the dash-pot piston 94 tends to move forwardly or to the left as viewed in Fig. 8, the piston thus forcing oil from within the cylinder back to the reservoir in the casing 42 via the restricted orifice 112. If the load is sudden and only temporary, the restriction 112 prevents surging of the load-control yoke 38 and consequently no overcorrection is permitted. However, should the load be more than a temporary load, the piston 94 can move slowly, regulated by the amount of oil passing outwardly from the orifice 112, so that proper correction is made.

The power lift or power control system comprises, in addition to the main casing 42 and parts contained therein, which will be presently described, an internal valve housing 114 and an external valve housing 116, the expressions "internal" and "external" being used with reference to the locations of the housings 114 and 116 relative to the main casing 42 and relative to an interior compartment 118 formed by the rear tractor part made up of the axle housing 22, which compartment opens at its rear as at 120, the opening being surrounded by an upright mounting surface 122.

The casing 42 has a mounting face 124 which abuts and is secured to the upright mounting surface 122 of the tractor body part 22, means such as a plurality of cap screws 126 being utilized as fasteners.

Figure 10:
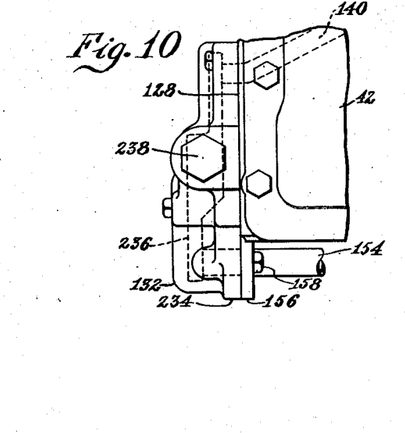
Fig. 10 is a fragmentary plan view of a portion of the power lift casing and housing arrangement, showing the substitution of a cover plate for the external valve housing.
Figure 11:
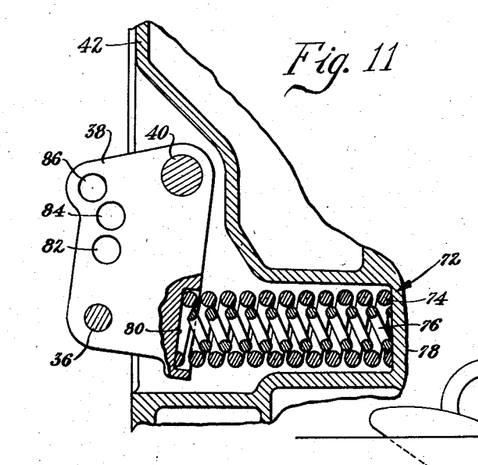
Fig. 11 is a sectional view showing the dual spring arrangement.

The casing 42 also has an upright rear mounting face 128 which is abutted by a front upright mounting face 130 of the external valve housing 116. In the event that the external valve housing 116 is not used, the rear face 128 of the main casing 42 is closed by a cover casting 132 (Fig. 10). For the present, it will be assumed that the three-piece power lift casing or housing structure is made up of the components 42, 114 and 116, a description of the details of the cover 132 being reserved until later.

The casing 42, in addition to serving as a fluid reservoir and in addition to rockably supporting the lift rockshaft 54, further contains an integral built-in fluid motor 134, made up of a cylinder 136 and piston 138, and a pressure passage 140 and a motor passage 142. The pressure passage 140 opens at its front and rear ends respectively at the front and rear faces 124 and 128 of the casing 42. The motor passage 142 opens at its front end at the front mounting face 124 and at its rear end communicates with the interior of the motor cylinder 136 by means of a short passage 144.

Figures 2, 3, 4, 5:
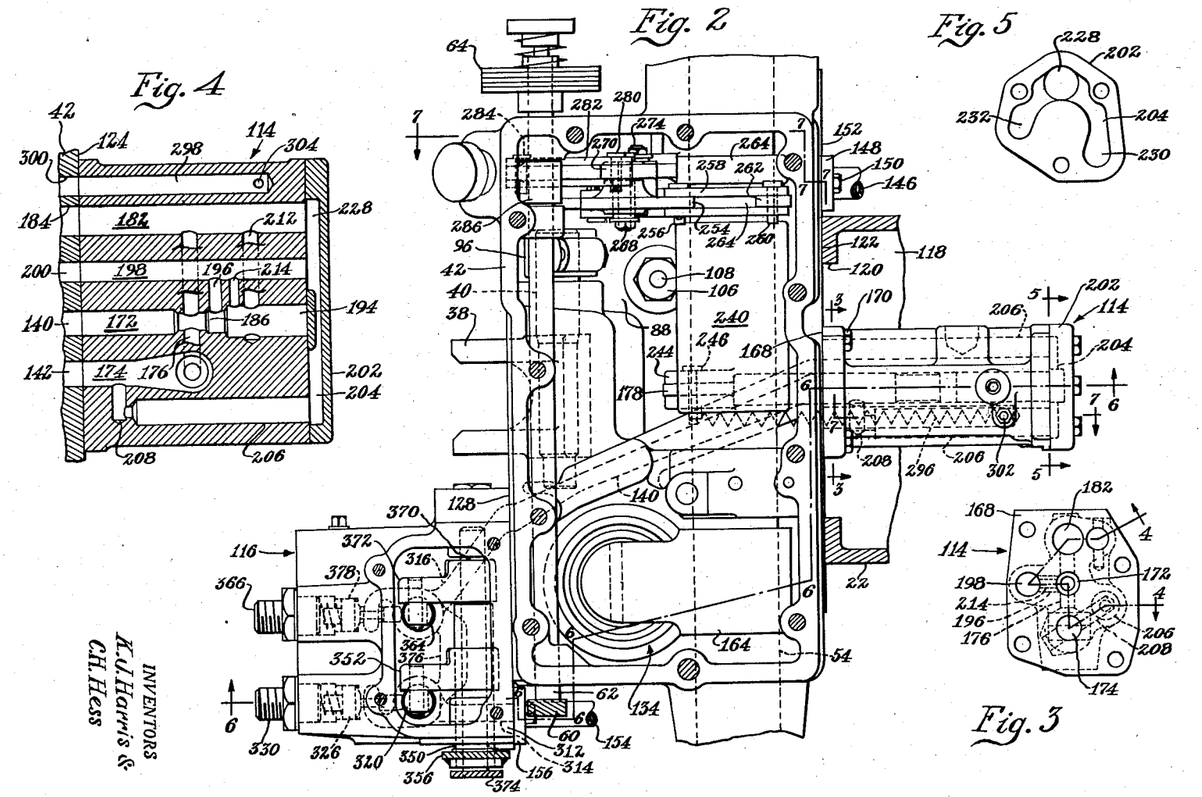
Fig. 2 is an enlarged plan view, partly in section, of the power lift casing and housing arrangement as seen generally along the line 2—2 of Fig. 1.
Fig. 3 is a sectional view as seen along the line 3—3 of Fig. 2.
Fig. 4 is a "developed" sectional view as seen along the line 4—4 of Fig. 3.
Fig. 5 is a sectional view as seen along the line 5—5 of Fig. 2.

The pressure source, represented by the pump 70, which has been previously identified, has its low side connected to the reservoir of the casing 42 by means of a suction line 146, the rear end of which is in the form of a flanged coupling 148 secured by cap screws 150 to a portion 152 of the casing 42 that is laterally offset so as to be external as respects the tractor body compartment 118 (Figs. 2 and 7). The high side of the pump 70 is connected to a high-pressure line or conduit 154, the rear end of which has a flanged coupling at 156 with either the external valve housing 116 or the cover plate or casing 132, cap screws 158 being used in either case to permit ready removal and interchangeability. For the present, the details will be omitted and it will be accepted that the high-pressure line 154 ultimately leads to the rear end of the pressure passage 140 in the casing 42.

The casing 42 has an open top normally closed by a removable cover 160, the cover having been removed from Fig. 2 to expose the mechanism within the casing. The power developed by the fluid motor 134 is transmitted to the lifting rockshaft 54 by means of a piston rod 162 and an internal force-transmitting arm 164. The motor is preferably of the one-way type, exerting a force to rock the rockshaft 54 in a clockwise direction for raising the draft linkage 30—32. Descent of the draft linkage is accomplished by gravity. The reservoir connection between the reservoir within the casing 42 and the flanged coupling 148 of the suction line 146 is accomplished by an integral suction or reservoir conduit 166 (Fig. 7).

The valve housing 114 has a rear mounting face 168 which is abutted against and secured to an intermediate portion of the front mounting face 124 of the casing 42, cap screws 170 being utilized as the securing means. The housing 114 is thus located within and projects forwardly into the compartment 118 of the tractor. The valve housing has upper and lower passages 172 and 174 having their rear ends opening at the rear face 168 and respectively in register with the pressure and motor passages 140 and 142 in the casing 42. The forward ends of the passages 172 and 174 are interconnected by a check valve chamber or passage 176. Thus, the composite passage made up by the portions 172, 174 and 176 may be considered as being U-shaped and control of this passage by valve means, to be presently described, serves to connect and disconnect the pressure and motor passages 140 and 142 in the casing 42.

Control of the passage 172—176—174 is accomplished by valve means including a main control valve 178 and a check valve 180, the check valve working in the check valve passage or chamber and the valve 178 operating in an elongated valve bore 182, the rear end of which opens through an opening 184 in the front wall or face 124 of the casing 42 so that the rear portion of the valve 178 extends into the interior of the casing 42. The U-shaped passage 172—176—174 is interruptible intermediate its ends by means of a differential valve passage 186 under control of a differential valve 188. This differential valve has piston portions 190 and 192 of different effective areas, the large portion being slidable in a bore 194 and the smaller portion serving to establish and break communication between the passage 186 and a cross passage 196 that leads to a return or exhaust passage 198 in the housing 114. The rear end of the return passage 198 opens at 200 through the front wall or face 124 of the casing 42 and thus leads to the reservoir within the casing.

The right-hand or front end of the valve housing 114 (Fig. 6) is closed by a removable cover 202 within which is formed a horeshoe-shaped recess 204 that interconnects the front ends of the valve bore 182, the return passage 198 and a safety valve passage or chamber 206. The rear end of the safety valve passage is connected to the passage 174 and consequently to the motor passage 142 by means of a short cross passage 208. A spring-loaded safety valve 210, the purpose of which will presently appear, normally closes the rear end of the safety valve passage. The control valve bore 182 and the differential valve bore 194 are cross-connected by a short vertical passage 212. The differential valve bore 194 to the rear of the differential valve piston 192 is cross-connected to the return passage 198 by means of a bleed passage 214, which prevents trapping of fluid behind the piston 192.

Figure 6:
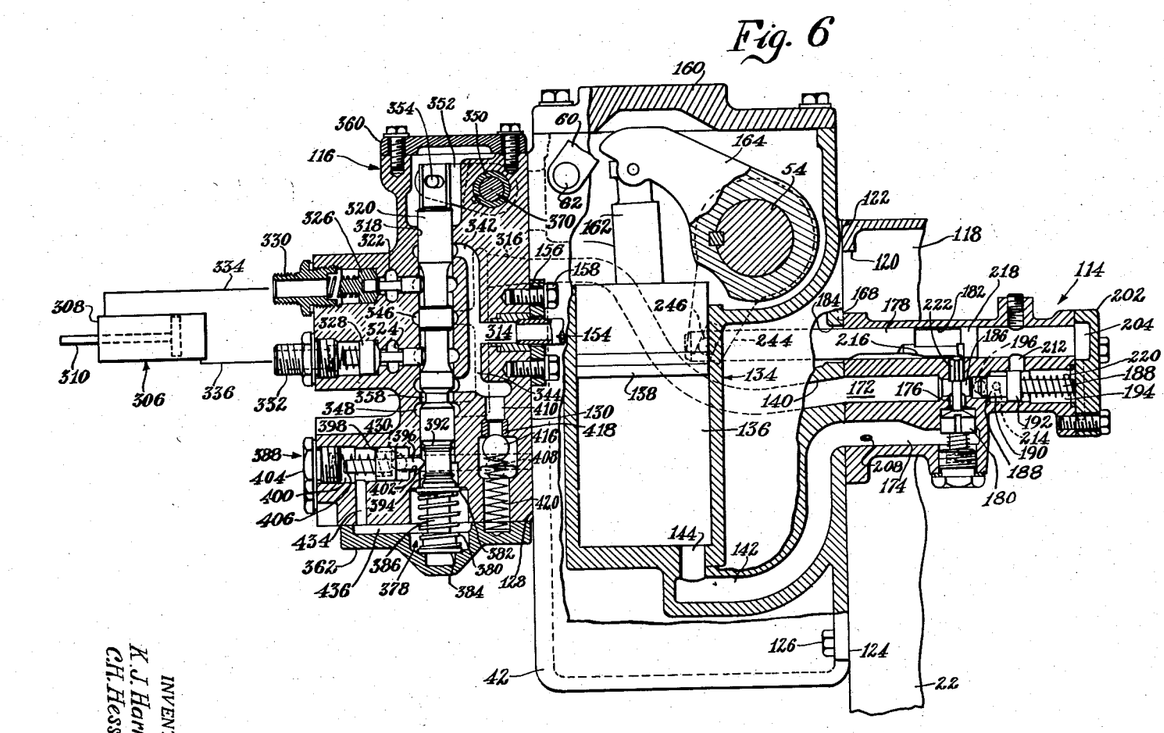
Fig. 6 is a longitudinal sectional view taken along the irregular line 6—6—6—6—6—6 of Fig. 2.

In Fig. 6, the piston 138 of the hydraulic motor 134 is shown at the top of its stroke and the internal control valve member 178 is shown in its position to effect lowering of the piston 138 and consequently lowering of the implement connected to the draft linkage 30—32. Fluid forced out of the cylinder 136 passes through the port or passage 144 and follows the passage 142 to the lower passage 174 in the internal valve housing 114, passing thence through the positively opened check valve 180, through the check valve passage or chamber 176 and to the return passage 198 via the cross passage 196, the differential valve 188 being forced open by the combination of returning fluid and the fluid pressure entering through the high-pressure passage 140—172. In the illustrated position of the control valve 178, the forward or right-hand end, by means of a ramp portion 216, has depressed the stem of the check valve 180 so as to positively open the check valve. The extreme forward or right-hand end of the valve member 178 comprises a cylindrical portion 218 that has a close sliding fit in the valve bore 182, thus preventing the transmission of fluid under pressure through the vertical passage 212 to the differential valve bore 194. Consequently, movement of the differential valve 188 to the right or forwardly is opposed only by a valve-loading spring 220.

It will be assumed for the moment that the internal control valve member 178 is directly under control of the hand lever 60 by mechanism not presently important. Suffice it to say that movement of the lever 60 is reflected in movement of the valve member 178. The neutral position of the valve member 178 is, of course, to the right of that shown in Fig. 6, the valve member moving to such extent as to remove the ramp portion 216 from the upper end of the check valve stem so that the check valve is allowed to seat and therefore to close the check valve passage 176. When the check valve closes, it isolates the motor passage 142—174 from the pressure passage 140—172, thus establishing a fluid or hydraulic lock on the motor 134 and preventing further lowering of the draft linkage and implement. Fluid under pressure from the pump 70 is allowed to circulate substantially freely because such fluid pressure keeps the differential valve 188 open and the incoming fluid passes to the reservoir via the passages 186, 196 and 198. When it is desired to rock the rockshaft 54 in the opposite direction so as to raise the draft linkage and implement, the control lever 60 is moved rearwardly so as to cause further movement of the control valve member 178 to the right, whereupon the cylindrical end portion 218 of the valve member 178 passes to the right of the vertical passage 212 and pressure fluid from the pressure passage 140—172, passing along the stem of the check valve 180, which is fluted at 222, passes along the reduced portion of the valve 178 afforded by the ramp 216 to enter the passage 212 to the right or ahead of the large piston 192 of the differential valve 188. Although the smaller piston 190 of the differential valve is also exposed to fluid under pressure, the difference in areas results in movement of the differential valve to the left, thus closing the passage 186, whereupon the build-up of pressure forces the check valve 180 to open and high presusre is transmitted to the cylinder 136 via the motor passage 174—142—144 (the passages being numbered in the order of the direction of fluid pressure flow). When the control valve member 178 is returned to neutral, the check valve again closes and reestablishes the hydraulic lock on the motor 134.

When the implement and draft linkage are raised and are transported over particularly uneven terrain, the tractor wheel or wheels may suddenly drop into a fairly abrupt hole, resulting in the transmission of considerable shock load to the vehicle. In such cases, if the shock load is of sufficient magnitude, the hydraulic lock in the motor 134 is released by automatic opening of the safety valve 210, thus permitting a portion of the hydraulically locked fluid to return to the reservoir from the passages 144—142—174—208—206 and across the horseshoe shaped recess 204 in the internal valve housing cover 202. The regulated escape of the amount of fluid indicated serves to cushion the shock. Because of the follow-up mechanism, to be described below, the original position of the draft linkage and implement is subsequently restored. The invention features the inclusion of the safety valve in a parallel passage along with the other passages in the internal valve housing, the whole being embodied in a unitary construction that is readily assembled to and removed from the front face of the main casing 42, being removable with that casing when the casing is removed from the tractor for repair, adjustment or maintenance. The spring load on the safety valve 210, as represented by a coiled compression spring 224, may be adjusted by means of an adjustable plug 226 to which access may be had by the removal of the end cover 202.

The horseshoe shaped recess 204 in the internal valve housing cover 202 and its relationship to the various passages in the valve housing 114 may be better understood by considering that the recess has an upper central portion 228 that is in alinement with the valve bore 182 and right- and left-hand tail portions 230 and 232 that are respectively in alinement with the safety valve passage 206 and return passage 198.

When the cover casting 132 is used in place of the external valve housing 116, an offset portion 234 on the cover serves as a means for receiving the flanged coupling 156 in the high-pressure line 154, the portion 234 being offset laterally of the casing 42 so as to be external thereof and in a position to receive the flanged coupling. The cover casting is internally formed with a continuous passage 236 which connects the high-pressure line 154 to the pressure passage 140 in the casing 42. Thus, a continuous supply of pressure from the pump 70 is afforded via the line 154, passage 236 and supply or pressure passage 140—172, and the communication between this passage and the motor passage 174—142—144 is controlled by the valve means 178—180—188 in the manner previously described. Since the safety valve 210 is designed only to relieve the hydraulic lock between the piston 138 of the motor 134 and the closed check valve 180, it is desirable to use a relief valve in the pressure line somewhere between the pump and the other side of the check valve 180. The general location of a suitable relief valve is indicated at 238 in the cover 132 in Fig. 10. The setting at which the relief valve 238 will open will be, of course, lower than that at which the safety valve 210 will open, for obvious reasons.

When only a single-function power control system is desired, the cover casting 132 will be used and the system will then be self-contained for the control of the internal or built-in motor 134, which is exclusively under control of the valve means in the internal valve housing 114, which valve means is under control of not only the hand lever 60 but of the load-control yoke or member 38 as well as the position of the draft linkage itself. That is to say, there are, as previously explained generally, three factors resulting in control of the internal valve means. Since the functioning of the position-load-responsive phase of the power lift or power control system is broadly independent of the external valve housing, the details of the external valve housing and its components may be postponed.

Figs. 2 and 7 best show the details of the follow-up linkage that interconnects the internal valve means, the rockshaft 54, the hand lever 60 and the load-control yoke 38. In this respect, it should be noted that the rockshaft 54 is selected as a work member that represents the position of the draft linkage and accordingly of the implement. Any other member movable in response to vertical adjustment of the implement could as well be used. However, the rockshaft in the present case is of specific importance because of its supporting of part of the followup linkage, the details of which will presently appear.

The rockshaft 54 carries thereon arm means made up of a sleeve 240 having integral depending arm parts 242 and 244, the latter of which is bifurcated and pivotally connected at 246 to the rearwardly projecting end of the control valve member 178 of the internal control valve means. The connection at 244—246 is slotted, because movement of the arm is arcuate about the center of the rockshaft 54 whereas movement of the valve member 178 is linear. The arm 240 constitutes no interference with the freedom of movement of the valve member 178, since the sleeve portion of the arm means is loosely journaled on the rockshaft 54.

The other arm 242 of the arm means is pivotally connected at 248 to the front end of a rearwardly extending link 250, the rearward end of which is pivotally connected at 252 to the lower end of an equalizer bar 254. The upper end of the equalizer bar is pivotally connected at 256 to the rearward end of a forwardly extending link 258, the front end of which is pivotally connected at 260 to a substantially upright arm 262 integral with a collar 264. The collar is rigidly affixed to the rockshaft 54 as by means of a set screw 266. Therefore, movement of the rockshaft 54 is reflected in movement of the arm 262 on the collar 264 and this movement is transmitted through the link 258 to the equalizer bar 254 and through the lower link 250 to the arm means 240—242—244 and thence to the control valve member 178. The arms 242 and 244 constitute first radial arm means and the arm 262 constitutes a second arm means arranged substantially diametrically as respects the arms 242 and 244. These are connected to the equalizer bar in the manner just described. The equalizer bar is pivoted or fulcrumed intermediate its ends at 268 to a first or upper level 270 of a pair of levers including a second lever 272 that is pivotally interconnected to the lower end of the upper or first lever 270 by a pivot 274. Stated otherwise, the pivot at 274 affords a joint pivotally interconnecting the proximate ends of the levers 270 and 272.

The lower end of the lower lever 272 is fulcrumed at 276 to a lug 278 at the bottom of the main casing 42; and the upper end of the upper or first lever 270 is pivotally connected at 280 to a rearwardly extending link 282 which has its rear end in turn pivotally connected at 284 to a depending arm 286 on an interior portion of the rockshaft 62 for the hand lever 60.

The arm 96, previously described as working in conjunction with the dash-pot 88—94, has an integral second arm portion 288, and a fore-and-aft extending link 290 is pivotally connected at its forward end at 292 to the lower lever 272 and at its rearward end at 294 to the arm portion 288.

The pivotal connections and fulcrum points just described are all adequately designed to afford the necessary freedom of movement for the parts. The pin 246, in addition to establishing a pivotal connection between the arm 244 and the rear end of the valve member 178, serves also as a rear anchor for a coiled tension spring 296, the forward end of which projects into a spring-receiving passage 298 in the internal valve housing 114 via a spring-receiving opening 300 in the front wall or face 124 of the casing 42. The forward end of the spring is appropriately anchored at 302 to a forward portion of the internal valve housing 114 and serves as means of substantially uniform bias tending to exert a force on the follow-up linkage to take up the slack therein and consequently to improve the sensitivity pattern of the system, the details of which are not important here since they form the subject matter of assignee's copending patent identified above. The numeral 304 in Fig. 4 designates a tapped bore for receiving the anchor 302 for the spring 296.

In the description of Fig. 6 it was noted that the piston 138 is at the upper end of the cylinder 136, resulting in positioning of the draft linkage and implement in a raised or lifted status. The same situation will be taken as obtaining in the following description of the follow-up mechanism, having particular reference to Fig. 7. It will, however, be assumed that the hand lever 60 has been moved forwardly along its sector 66 to initiate lowering of the piston 138. What will be required, then, to halt the descent of the piston 138 will be return of the valve 178 to its neutral position, which will be a movement to the right, as viewed in Fig. 6, or to the left, as viewed in Fig. 7, which will result in removing the ramp 216 from the stem of the check valve 180 so that the check valve can close under the action of its biasing spring. In the ensuing description, it will be assumed that the valve is being manually restored to its neutral position and that the cover casting 132 of Fig. 10 is used in lieu of the casing 116.

When the hand lever 60 is moved to the rear (clockwise as viewed in Fig. 7; counterclockwise as viewed in Fig. 6), the hand lever rockshaft 62 is accordingly rocked and the arm 286 on that rockshaft swings forwardly to exert a forward force on the upper follow-up lever 270 through the upper link 282. Since the rockshaft 54 is fixed, the pivotal connection at 260 cannot swing about the axis of the rockshaft 54 and accordingly the pivotal connection 256 at the other end of the link 258 becomes a fulcrum. Likewise, since the load-control yoke 38 is fixed at this time, its rockshaft 40 and associated arms 96 and 288 are also fixed. This, through the link 290, fixes the position of the lower follow-up lever 272 and that lever cannot fulcrum about 276. However, the joint 274 serves as a fulcrum so that when the upper link 282 is moved forwardly by the hand lever control arm 286, the upper follow-up lever 270 swings about the fulcrum at 274 and the force is transmitted forwardly through the link 250 to the arm 242. Since this arm is an integral part of the sleeve 240 to which the arm 244 is fixed at 246, the force is ultimately transmitted in a forward direction (to the right in Fig. 6; to the left in Fig. 7) to the control valve 178, thus moving this valve to neutral and allowing the check valve 180 to close.

Let it now be assumed that the operator desires to supply fluid to the motor 134 for the purpose of raising the draft linkage and implement. To do so, he will move the hand lever 60 rearwardly and the various motions just described will again occur to displace the control valve 178 forwardly so that fluid under pressure is supplied through the passage 140—172 to the motor passage 174—142—144. As the piston 138 moves upwardly in the cylinder 136 it rocks the rockshaft 54 in a clockwise direction, as viewed in Fig. 6, or a counterclockwise direction, as viewed in Fig. 7. The follow-up linkage is arranged so that movement of the hand lever 60 is proportional to movement of the rockshaft 54, with the result that when the rockshaft 54 attains a certain position the control valve 178 will be automatically returned to neutral. This follows from the fact that as the rockshaft 54 turns, it carries with it the follow-up arm 262, which arm pulls forwardly through the link 258 on the equalizer bar 254. The point 280 now becomes a fulcrum, since the position of the hand lever 60 is now fixed, as is the position of the load-control rockshaft 40. Therefore, the equalizer bar 254 pivots about the pivot point 268 established by the connection of the equalizer bar 254 to the upper follow-up lever 270. As the lower end of the equalizer bar swings to the rear (to the right in Fig. 7), the arm means 240—242—244 is rocked in a counter-clockwise direction (Fig. 7) and the valve member 178 is restored to neutral.

Restoration of the valve 178 to neutral is accomplished also by movement of the rockshaft 54 following adjustment of the valve as a result of changes in position of the load-control yoke 38 in response to changes in draft forces. For example, assuming that the position of the hand lever 60 determines a plowing position of the plow bottoms 52, it is expected that the plowing operation will be conducted under such circumstances that, theoretically at least, a constant draft load will occur between the tractor and the plow. However, should this draft load increase, the top link 32 will thrust forwardly on the load-control yoke 38, thus rocking the load-control rockshaft 40 in a clockwise direction as seen in Fig. 7. The follow-up arm 288 on the load-control rockshaft 40 within the casing 42 will transmit this force forwardly through the link 290 to the lower follow-up lever 272. This lever is fulcrumed at 276, as previously described, and its upper end will swing forwardly, carrying with it the lower end of the upper lever 270, since the two levers are interconnected at 274. Since the position of the rockshaft 54 is fixed, as is the position of the hand lever 60, the upper follow-up lever 270 will fulcrum about the point 280 and the equalizer bar 254 will fulcrum about the point 256. As a consequence, the valve 178 will be moved forwardly from the neutral position to which it had been previously returned in response to attainment by the implement of its predetermined position as selected by the hand lever 60, which position must be now departed from because of the increase in draft load. Therefore, fluid under pressure will be supplied to the motor 134 for the purpose of raising the implement until the draft load reaches the predetermined value for which the hand lever 60 was set. As the implement moves to its new position, it is accompanied, of course, by rocking of the rockshaft 54 which again restores the valve 178 to neutral in the manner explained above. A reverse result will occur when movement of the load-control yoke 38 is in the opposite direction because of lessening of the draft forces.

It will thus be seen from the foregoing description that the valve member 178 is under control of the hand lever 60, the rockshaft 54 and the load-control yoke 38. The follow-up linkage is wholly contained in the casing 42 and is therefore not exposed to the hazards of dirt, damage, etc. During all of the changes or adjustment of the valve 178, the slack in the follow-up linkage is taken up by the spring 296 and in addition oscillations and vibrations that might otherwise occur in the linkage are damped out by the dash-pot 88—94, thus giving the dash-pot a function in addition to that previously described in connection with damping of shocks incident to movement of the load-control yoke 38.

The description thus far has proceeded on the basis of the use of the cover casting 132 in place of the external valve housing 116, thus affording a power control system for integrally mounted or drawn implements having adjustable parts receiving adjusting power from the lift arms on the lift rockshaft 54. That is to say, the tractor itself serves as the base from which the lifting power is exerted. However, there are many implements in which adjustment is more readily accomplished by a motor apart or remote from the tractor. One example is the pull-behind combine in which it is conventional to utilize a remote motor for adjusting the header or platform. The desirability of a remote motor is present in many other implements and known power control systems have in the past utilized the remote motor principle.

As shown here, the power control system is of the multiple-function type, providing two or more valves, one of which controls the internal motor 134, and one or more additional valves, contained in the external valve housing 116, control one or more remote motors, such as the remote motor shown schematically in Fig. 6 at 306 as comprising a cylinder 308 and piston 310. In this adaptation of the instant power control system, the cover casting 132 is removed and is replaced by the external valve housing 116 as shown best in Figs. 2, 6 and 7.

The housing 116, as previously described, has the front mounting face 130 which abuts and is secured to the rear mounting face 128 of the main casing 42. A forward portion of the external valve housing 116, as at 312, is laterally offset from the main casing 42 so as to afford a connection for the flanged coupling 156 of the high-pressure or pump line 154 (Fig. 2). The housing 116 therefore has a fluid inlet passage 314 and further has an exhaust or outlet passage 316 which, when the housing 116 is mounted on the rear face of the casing 42, is in register with the pressure passage 140 in the casing. Disregarding for the moment the presence of valve mechanism in the housing 116, it will be recognized that the housing 116 serves as a conduit for the transmission of fluid pressure from the high-pressure line 154 to the internal valve housing 114 via the pressure passage 140 in the casing 42, from which the interchangeability of the housing 116 and cover casting 132 will be appreciated. In short, what the housing 116 does is to interpose one or more independent valves in the circuit between the pump and the internal valve 178, and the interposed valves are in series with the valve 178.

In the present case, there are two such valves for controlling two remote motors such as the motor 306 but, since these are duplicates, only one will be described in detail.

The external valve housing 116 has therein an upright valve bore 318 in which a spool-type valve member 320 is slidable for controlling the inlet and outlet passages 314 and 316 as well as the upper and lower motor passages 322 and 324. The passages 322 and 324 are additionally controlled respectively by upper and lower check valves 326 and 328 and male coupling parts 330 and 332 are adapted to be connected by motor lines 334 and 336 respectively to opposite ends of the cylinder 308 of the remote motor 306. When the remote motor 306 is not used, the coupling parts 330 and 332 may be capped as shown at 338 and 340 in Fig. 1. The inlet 314 has upper and lower branches 342 and 344 connectible respectively to the motor passages 322 and 324, depending upon the direction of displacement of the valve member 320. Upper and lower exhaust grooves 346 and 348 surround the valve bore 318 in axially spaced relation to each other and lead to the outlet 316. These are also selectively connectible to the motor passages 322 and 324, depending upon the direction of movement of the valve member. The valve member is controlled by a rockshaft 350 which is internally connected by an arm 352 and pin 354 to the upper end of the valve member 320 and which is externally connected to a hand lever 356 that is additional to and independent of the previously described hand lever 60.

When the external valve member 320 is in its neutral position, as shown in Fig. 6, fluid from the high-pressure line flows through the casing pressure passage 140 via 314, 344, 348 and 316; a portion 358 of the valve bore 318 serving to connect the inlet branch 344 to the lower exhaust annulus or groove 348. Hence, control of the internal motor 134 by the internal valve member 178 can occur as described above. When the valve member 178 is also in its neutral position, the pump pressure is circulated to the reservoir in the casing 42 via the internal valve housing return or exhaust passages 186, 196 and 198.

The external valve housing 116 is closed at its top and bottom respectively by covers 360 and 362. The top cover has been removed from the housing 116 in Fig. 2, wherein it will be seen that the housing carries a second valve member 364 which is a duplicate of the valve member 320 and which controls appropriate passages including motor outlets having upper and lower coupling parts 366 and 368. The bore in which the valve member 364 operates receives its fluid pressure from an inlet (not shown) that is connected in series with the exhaust annulus 348 in the valve bore 318, so that when the valve member 320 is in its neutral position, pressure fluid flows from 348 through a passage system duplicating that for the valve member 320 before flowing out through the outlet 316 and thence through the casing motor passage 140, it being understood that the valves 320, 364 and 178 are in series in the order named.

The control rockshaft for the valve member 320 is tubular (Fig. 6) and a second valve control rockshaft 370 passes loosely through the tubular rockshaft 350 to carry at its inner end an arm 372 for effecting vertical displacement of the valve member 364. A second manual lever 374 is fixed to the outer end of the rockshaft 370, thereby affording independent control of the valve members 320 and 364.

A general understanding of the series arrangement between the valve bores for the valve members 320 and 364 may be obtained from the dotted-line showing in Fig. 2, wherein the inlet 314 is visible as leading to the valve 320 and the outlet 316 is shown as leading from the valve member 364. The view also shows an interconnecting passage 376 between the two valves. Also visible in Fig. 2 is an upper check valve 378 for the upper motor outlet 366 of the second pair 366 and 368.

When the valve member 320 is displaced in one direction or the other to supply fluid to one end or the other of the remote motor 306, fluid returning from the other end of that motor follows the associated exhaust passage and flows thence across the passage 376 and is available for controlling a second remote motor connected to the motor outlets 366 and 368 or may be led directly to the internal valve housing 114, depending upon whether or not the second valve 364 is in neutral or active position. The fluid may then be directed to the reservoir in the casing 42 or may be used to extend the motor 134, depending upon whether the internal valve member 178 is in neutral or an active position. If, in the preceding description, the valve member 364 were in active position, the fluid returning from the opposite end of the remote motor controlled thereby would be conveyed in any event to the internal valve housing 114 via the casing motor passage 140. The end result in any case is that the fluid, whether or not used by either or both of the valve members 320 and 364, ultimately traverses the casing 42 via the internal motor passage 140 and leads to the internal valve housing 114 and ends ultimately in the reservoir in the casing 42. The system accordingly affords wide flexibility of use, in the present instance enabling the use of a pair of remote cylinders along with the use of the internal cylinder 134. Since any of the valves may be operated independently or simultaneously, the system is admirably adapted for its multiple-function operation, and use of one or the other of the three valves does not mean that the user must sacrifice the operation of another of the valves, as in the prior art.

There is a basic difference between the types and operation of the valve members 178 and 320, for example. The valve member 178 depends for positioning upon selective setting of the control lever 60, and is automatically returned to neutral by the follow-up linkage (Fig. 7) previously explained. On the other hand, the valve 320 has a neutral position (as shown in Fig. 6) and first and second or upper and lower active positions to either of which it may be forcibly moved by rocking of the tubular rockshaft 350 via the hand lever 356, but the valve member 320 is biased for return to its neutral position by yielding centering means designated generally by the numeral 378. This means comprises a coil spring 380 acting against upper and lower washers 382 and 384 through which a lower extension 386 of the valve member 320 is slidable. Thus, if the valve member 320 is moved downwardly and the operator releases the lever 356, the centering means 378 will tend to return the valve to neutral. The same will occur after the valve member is moved upwardly and the operator releases the lever 356. A duplicate centering means (not shown) is provided for the other valve member 364, but a detailed disclosure thereof would be a repetition of the disclosure of the centering means 378.

It is conventional in valves of the general type represented by the valve member 320 to provide some form of means for retaining the valve member in either of its active positions, and it is also conventional to utilize some form of means, responsive to excess pressure in the circuit, to automatically return the valve to its neutral position. Such means is used here and will be referred to broadly as detent means 388, which is the subject of copending application Ser. No. 542,449, filed October 24, 1955. A second detent means (not shown) is provided for the other valve member 364 but again duplicate disclosure in detail will be avoided.

The portion of the control valve member 320 just above the centering means 378 has formed therein upper and lower detent-receiving portions or grooves 392 and 394, either of which, depending upon the position of the valve member 320, is adapted to receive and be releasably locked by a detent pin 396 rigid on a detent piston 398 contained within a detent chamber 400. The detent pin or element 396 projects through an opening 402 in the wall portion of the valve housing 116 that separates the detent chamber 400 from the valve bore 318, and the rear end of the chamber 400 is closed by a removable plug 404 between which and the piston 398 is seated biasing means in the form of a spring 406 that constantly urges the piston 398 and detent element 396 forwardly or to the right as viewed in Fig. 6 so that the detent pin or element 396 is always ready for engagement with either of the grooves 392 or 394. These grooves are spaced axially apart a considerable distance, allowing for movement of the valve member 320 in opposite directions through a predetermined range without causing engagement of the detent means with one or the other of the detent grooves 392 or 394. Thus, the operator is able to utilize the valve member 320 for slow speed operation or for operation through relatively short periods without effecting a lock-up of the valve. However, for faster speeds and longer periods of operation, he can move the valve member an additional distance to effect establishment of the functioning of the detent means. Because of the shape of the grooves 392 and 394 and the end of the detent pin 396, the detent may be released by forcible movement of the valve member 320 so that the operator may return it to neutral. However, the present design includes means for automatically effecting return of the valve member 320 to its neutral position from either of its active positions. This means, to be described somewhat in detail below, utilizes hydraulic release of the detent means 388 so that the centering means 378 becomes effective to restore the valve member to its neutral position.

The lower portion of the external valve housing 116 includes a relief conduit or passage 408 connected by a short passage 410 to the inlet branch 344 and controlled by a first relief valve 416 in the form of a ball seating on a seat insert 418 and loaded or biased by a coiled compression spring 420 so that the conduit is normally blocked off from communication with the front face of the detent piston 398, as at 430. When the relief valve 416 opens in response to excess pressures fluid will be diverted through 430 to release the detent means 388 so that the valve member 320 may be returned from its active position to its neutral position. A bleed 434 leads off from the detent chamber 388 behind the piston 398 so as to prevent the trapping of fluid under pressure in that portion of the detent chamber. This bleed leads to a recess 436 in the bottom cover 362 for the external valve housing 116, which recess is connected in any suitable manner to the reservoir in the casing 42. This recess also prevents the accumulation of fluid under pressure in the chamber in which the centering means 378 is located as well as in the chamber that carries the relief valve spring 420.

The operation of the various components of the system has been described in connection with the description of the structure. The over-all operational characteristics of the inventive design disclosed here can be gathered from the individual functions ascribed to the parts and accordingly need not be elaborated. Features of the invention not categorically described will undoubtedly occur to those versed in the art, as will many modifications and alterations in the preferred embodiment of the invention as presented here, all of which may be achieved without departing from the spirit and scope of the invention.

What is claimed is:

1. In a tractor having vertically adjustable draft linkage connectible to an agricultural implement, a fluid-pressure-operated power control system comprising: support means on the tractor, including a cylinder and a piston movable in the cylinder and connected to the draft linkage for raising, lowering and supporting said linkage; a fluid pressure source and a fluid reservoir on the tractor; a valve housing on the support means and formed with a pressure passage having an inlet end, an outlet end and a check valve chamber intermediate said ends, said housing further having a safety valve chamber therein parallel with and cross-connected to the pressure passage downstream of the check valve chamber and having a reservoir outlet, and a reservoir passage parallel with and cross-connected to the pressure passage upstream from the check valve chamber; first fluid conduit means connecting the inlet end of the pressure passage to the pressure source; second fluid conduit means connecting the outlet end of the pressure passage to the cylinder; a safety valve in the safety valve chamber normally biased to close off said safety valve chamber from its reservoir outlet; adjustable control means carried by the housing and including a check valve normally biased to close the check valve chamber against the transmission of fluid between the inlet and outlet ends of the pressure passage, and control valve portions operative in a neutral position to leave the check valve closed and to communicate the pressure passage with the reservoir passage upstream of the closed check valve, said control valve portions being further operative in an active position to close said reservoir passage and to incur opening of the check valve for supplying fluid to the cylinder to move the piston in one direction; and a high-pressure relief valve in the first fluid conduit means separate and apart from the safety valve for relieving high fluid pressures throughout the system incident to the supply of fluid to the cylinder, and said safety valve being openable against its bias to relieve high pressures in the pressure passage and second fluid conduit means incurred downstream of the check valve and incident to movement of the piston by forces external to the system and in the direction opposite to the aforesaid direction when the check valve is closed and the control valve portions are in neutral.

2. The invention defined in claim 1, including: a control lever selectively settable to incur the neutral and active positions of the control valve portions; and follow-up means interconnecting the draft linkage and the control means for shifting the control valve portions between neutral and active positions in proportion to movement of the draft linkage so that movement of the piston in the aforesaid opposite direction in response to opening of the safety valve will be followed by adjustment of the control means by said follow-up means to restore the position of the draft linkage.

3. In a tractor having a body, including a rear compartment provided with an open rear mounting surface, a power control mechanism comprising: a main casing having front and rear faces and including an internal built-in fluid motor and a power lift rockshaft connected to said motor, said casing having its front face abutting the rear surface of the tractor body; an internal valve housing secured to the front face of the casing and extending forwardly into the tractor body and containing internal valve means for controlling the aforesaid motor; an external valve casing secured to the rear face of the main casing and provided with fluid pressure outlets for an external fluid motor separate from said internal motor; and external valve means independent of the first valve means and contained in the external casing for controlling said external casing motor outlets.

4. The invention defined in claim 3, in which: the external valve housing has a portion offset laterally from the main casing and provided with a fluid pressure inlet leading to the valve means in said external valve housing, and said external valve housing, said main casing and said internal valve housing having passages therein alined to provide a single fluid pressure passage leading from the external valve means to the internal valve means.

5. The invention defined in claim 3, in which: the main casing has a lower interior portion serving as a reservoir; the external and internal valve housings respectively have reservoir outlets therein leading to said reservoir; and said main casing has a portion offset laterally from the tractor body and provided with a suction outlet externally of the tractor body and leading from said reservoir.

6. In a tractor having a body including a rearwardly opening compartment provided with a mounting surface, a fluid-pressure-operated control system comprising a pressure source on the tractor; a main casing having front and rear faces and mounted on the tractor with its front face abutting and secured to the tractor mounting surface and further having a pressure passage therethrough opening at opposite ends respectively at the front and rear faces an internal built-in fluid motor and a motor passage opening at the front face and leading to said motor, said casing having a portion thereof affording a fluid reservoir and including a suction outlet connected to the low side of the aforesaid pressure source; a bidirectionally movable load-moving member connected to and movable by said motor; an external valve housing having a front face abutting and secured to the casing rear face and including an inlet connected to the high side of the pressure source, a motor line opening at a portion of said housing other than its front frace and adapted for connection to a remote motor, and an outlet opening at said front face in register with the rear end of the casing pressure passage, said housing having selectively positionable valve means therein in controlling relation to said inlet, motor line, and outlet and operative at least in one position to interconnect the inlet and outlet to the exclusion of the motor line and operative in another position to interconnect the inlet and the motor line to the exclusion of the outlet; and an internal valve housing within the tractor compartment and having a rear face abutting and secured to the casing front face and including U-shaped passage means having opposite ends opening at said rear face respectively in register with the pressure and motor passages in the casing and an intermediate portion opening as a reservoir outlet leading to the casing reservoir, said internal valve housing further containing valve means separate from the aforesaid external valve means and selectively positionable to control the U-shaped passage means for diverting fluid from the casing pressure passage selectively to the reservoir and to the internal motor for causing movement of the load-moving member.

7. The invention defined in claim 6, in which: the internal valve means is effective in a neutral position to divert pressure fluid from the casing pressure passage to the reservoir outlet and simultaneously to block return fluid from the casing motor passage against entry to the reservoir outlet so as to establish a fluid lock on the internal motor and thereby to immobilize the load-moving member; the internal valve housing includes a safety valve chamber opening at one end to the reservoir and opening at its other end to the U-shaped passage means intermediate the reservoir outlet and the junction of said U-shaped passage means with the casing motor passage; and a safety valve in said chamber and biased to a closed position to normally separate the ends of said chamber, said safety valve being arranged to open in response to excess pressures in the internal motor and internal motor passages for relieving the fluid lock on the internal motor while the internal valve means is in neutral.

8. The invention defined in claim 6, in which: the pressure source is carried by the tractor externally of the tractor compartment; the external valve housing has a portion offset laterally from the main casing and the inlet opens at said offset portion so as to lie externally of both said casing and the tractor; and the main casing has a portion offset laterally from the external to the tractor compartment and said casing suction outlet is in and opens through said casing offset portion so as to lie external to the tractor for connection to the pressure source.

9. In a tractor having a body including a rearwardly opening compartment provided with a mounting surface; a fluid-pressure-operated control system comprising a pressure source on the tractor; a main casing having front and rear faces and mounted on the tractor with its front face abutting and secured to the tractor mounting surface and further having a pressure passage therethrough opening at opposite ends respectively at the front and rear faces, an internal built-in fluid motor and a motor passage opening at the front face and leading to said motor, said casing having a portion thereof affording a fluid reservoir and including a suction outlet connected to the low side of the aforesaid pressure source; a bidirectionally movable load-moving member connected to and movable by said motor; an external valve housing having a front face abutting and secured to the casing rear face and including an inlet connected to the high side of the pressure source, a pair of motor lines opening at a portion of said housing other than its front face and adapted for connection to opposite ends of a remote motor, and an outlet opening at said front face in register with the rear end of the casing pressure passage, said housing having selectively positionable valve means therein in controlling relation to said inlet, motor lines and outlet and operative at least in one position to interconnect the inlet and outlet to the exclusion of the motor lines and operative in another position to interconnect the inlet and one motor line and simultaneously to interconnect the other motor line and the outlet; and an internal valve housing within the tractor compartment and having a rear face abutting and secured to the casing front face and including U-shaped passage means having opposite ends opening at said rear face respectively in register with the pressure and motor passages in the casing and an intermediate portion opening as a reservoir outlet leading to the casing reservoir, said internal valve housing further containing valve means separate from the aforesaid external valve means and selectively positionable to control the U-shaped passage means for diverting fluid from the casing pressure passage selectively to the reservoir and to the internal motor.

10. In an agricultural tractor having a bidirectionally movable load-moving member, a fluid-pressure-operated power control system comprising: support means on the tractor, including a cylinder and a piston movable in the cylinder and connected to the load-moving member for selectively moving and immobilizing said member; a fluid pressure source and a fluid reservoir on the tractor; a valve housing on the support means and formed with a pressure passage having an inlet end, an outlet end and a check valve chamber intermediate said ends, said housing further having a safety valve chamber therein parallel with and cross-connected to the pressure passage downstream of the check valve chamber and having a reservoir outlet, and a reservoir passage parallel with and cross-connected to the pressure passage upstream from the check valve chamber; first fluid conduit means connecting the inlet end of the pressure passage to the pressure source; second fluid conduit means connecting the outlet end of the pressure passage to the cylinder; a safety valve in the safety valve chamber normally biased to close off said safety valve chamber from its reservoir outlet; adjustable control means carried by the housing and including a check valve normally biased to close the check valve chamber against the transmission of fluid between the inlet and outlet end of the pressure passage, and control valve portions operative in a neutral position to leave the check valve closed and to communicate the pressure passage with the reservoir passage upstream of the closed check valve, said control valve portions being further operative in an active position to close said reservoir passage and to incur opening of the check valve for supplying fluid to the cylinder to move the piston in one direction; and a high-pressure relief valve in the first fluid conduit means separate and apart from the safety valve for relieving high fluid pressures throughout the system incident to the supply of fluid to the cylinder, and said safety valve being openable against its bias to relieve high pressures in the pressure passage and second fluid conduit means incurred downstream of the check valve and incident to movement of the piston by forces external to the system as applied to the load moving member and in the direction opposite to the aforesaid direction when the check valve is closed and the control valve portions are in neutral.

11. The invention defined in claim 10, including: a control lever selectively settable to incur the neutral and active positions of the control valve portions; and follow-up means interconnecting the load-moving member and the control means for shifting the control valve portions between neutral and active positions in proportion to movement of the load-moving member so that movement of the piston in the aforesaid opposite direction in response to opening of the safety valve will be followed by adjustment of the control means by said follow-up means to restore the position of the load-moving member.

References Cited in the file of this patent

UNITED STATES PATENTS

| | | |
|---|---|---|
| 2,118,180 | Ferguson | May 24, 1938 |
| 2,223,002 | Ferguson | Nov. 26, 1940 |
| 2,295,948 | Henry | Sept. 15, 1942 |
| 2,477,710 | Worstell | Aug. 2, 1949 |
| 2,533,466 | Jirsa et al. | Dec. 12, 1950 |
| 2,611,306 | Strehlow et al. | Sept. 23, 1952 |
| 2,631,514 | Roeder | Mar. 17, 1953 |
| 2,667,745 | Smith et al. | Feb. 2, 1954 |